(12) United States Patent
Kovac

(10) Patent No.: US 9,843,354 B2
(45) Date of Patent: Dec. 12, 2017

(54) BELT SYSTEM INTERFACE APPARATUS FOR USE WITH RADIO TRANSMITTER

(71) Applicant: Creative Law Enforcement Resources, Inc., South Pasadena, CA (US)

(72) Inventor: Kresimir Kovac, Fountain Valley, CA (US)

(73) Assignee: Creative Law Enforcement Resources, Inc., South Pasadena, CA (US)

( * ) Notice: Subject to any disclaimer, the term of this patent is extended or adjusted under 35 U.S.C. 154(b) by 0 days.

(21) Appl. No.: 15/236,800

(22) Filed: Aug. 15, 2016

(65) Prior Publication Data

US 2017/0054461 A1 Feb. 23, 2017

Related U.S. Application Data

(60) Provisional application No. 62/206,791, filed on Aug. 18, 2015.

(51) Int. Cl.
*H01R 13/35* (2006.01)
*H04B 1/3827* (2015.01)

(52) U.S. Cl.
CPC ..... *H04B 1/385* (2013.01); *H04B 2001/3855* (2013.01)

(58) Field of Classification Search
CPC ............. H04B 1/385; H04B 1/3833; H04B 2001/3855; H04M 1/6041; G06F 1/163; A41F 9/002; A41D 1/002; H01R 13/04; H01R 13/35
See application file for complete search history.

(56) References Cited

U.S. PATENT DOCUMENTS

| | | | | |
|---|---|---|---|---|
| 6,026,282 A * | 2/2000 | Garcia | ............ | H04B 1/3833 455/347 |
| 2007/0211036 A1* | 9/2007 | Perkins | ............ | G06F 1/163 345/173 |
| 2015/0279187 A1* | 10/2015 | Kranz | ............ | H04M 1/6041 340/539.12 |

* cited by examiner

*Primary Examiner* — Thanh Le
(74) *Attorney, Agent, or Firm* — Smyrski Law Group, a P.C.

(57) ABSTRACT

A radio connection apparatus configured for use with a radio comprising an accessory connector arrangement is provided. The radio connection apparatus includes a radio connector configured to join with the radio accessory connector arrangement and a pouch connector configured to fixedly interconnect with a connector of a radio pouch such that removal of the radio from the pouch causes removal of the pouch connector from the connector of the radio pouch. The radio connector and pouch connector electrically interconnect with a processing device such that signals are transmitted between the radio and the processing device.

20 Claims, 13 Drawing Sheets

BELT SYSTEM INTERFACE APPARATUS FOR USE WITH RADIO TRANSMITTER

This application claims priority to U.S. Provisional Patent Application Ser. No. 62/206,791, entitled "Belt System Interface Apparatus for Use with Radio Transmitter," inventor Kresimir Kovac, filed Sep. 18, 2016, and is related to U.S. patent application Ser. No. 14/620,748, entitled "Belt System for Use with Video/Audio Recording Devices," inventor Kresimir Kovac, filed Feb. 12, 2015, the entirety both of which are incorporated herein by reference.

BACKGROUND

I. Field

The present disclosure relates generally to the field of devices used in performing public safety duties, and more particularly to the integration of radio or communication systems in law enforcement, private security, or military scenarios. The design integrates automated activation triggers, metadata, GPS, video/audio into body worn technology such as video/audio recording devices and processors with a dedicated radio system carried or worn by a person.

II. Background

Radio communication devices are used in virtually every field of public safety including military, police, fire and are used widely in industrial and other settings as well. Radios provide a mechanism for critical communication between individuals and groups in various industries and play a crucial role in ensuring public safety. Almost every law enforcement officer is equipped with a radio, either handheld and/or mounted within his or her police vehicle. These radios enable first responders to coordinate the strategic deployment of resources and life-saving efforts as well as request for help in an emergency. Current radios are limited, however, in their integration capabilities with newer body worn technologies.

Modern handheld radios are designed for long-term use and for withstanding extreme conditions. Radios may be waterproof or able to endure extreme heat so as to remain functional in critical situations. Most radios are utilized for the sole purpose of enabling voice communication between individuals. Although radios integrating GPS or other technologies are available, they tend to be limited in their functionality and also limited in their ability to integrate with modern body worn communication devices, information gathering devices, and other related technologies.

Radios in use by law enforcement, for example, typically contain an emergency trigger button or switch that sends an alert signal to predefined radio centers and/or command centers indicating that the radio user is involved in some type of emergent event and needs help immediately. A typical scenario involving an emergency trigger activation would be a police officer who is involved in a physical confrontation or fight with a suspect. In such a case, the officer may have only time to push the emergency trigger button on the body of his/her radio and may not have the time or opportunity to transmit to other police units as to his/her location and request help. The emergency trigger is typically manufactured into and provided at an exterior point on the radio.

Additionally, almost all manufacturers of radios (Motorola, Harris, Vertec, Kenwood, ICOM, etc.) provide the capability of adding a wired handset microphone/speaker that connects to an interface on the radio. The handset allows the radio to be carried on the person of an officer and to be utilized without removing the radio from a radio pouch or holster. Many of these radio handsets are manufactured with an emergency trigger button built into the handset. When the emergency trigger button is depressed on the handset, the handset sends a signal to the radio via a connected cable. The radio then transmits an emergency signal.

Emergency radio triggers are not utilized to their full potential capacity, however, due to their limited functionality and general lack of integration with other communication and information technologies. Unfortunately, first responders must typically rely on other technology, such as vehicle provided GPS for example, to locate and send help to the individual in the emergency.

In addition to existing radio technology's limited integration with other public safety technology, there are limited options in terms of handsets and accessories and overall functionality available to radio communications users. Most accessory devices require integration by the equipment manufacturer, therefore requiring third party or aftermarket proprietary equipment and software. Aftermarket radio accessories including handsets, headsets, microphones, etc. are available, however, their use may void original manufacturer warranties or impact the reliability of the radio device, and some aftermarket products are simply unapproved for use within certain agencies. Modifying existing radios in use by law enforcement (or other agencies) will generally void manufacture warranties and may create reliability or interoperability issues. Radio manufacturers are generally unwilling to create numerous modifications of their radio products in order to assimilate outside technological devices and capabilities.

Modern technological advancements, particularly the use of body worn recording devices, have created a need to more effectively and seamlessly integrate technology available to first responders in fields such as law enforcement and the military. There has been little previous need to integrate radio communications with other worn technology. However, body worn cameras are quickly becoming one of the most critical tools available to law enforcement, and currently lack the ability to materially interface with a radio worn, for example, on a duty belt. Body worn cameras are needed for evidentiary purposes and a lack of integration with radio communication technologies hinders the capabilities of body worn devices and therefore the safety of their corresponding users.

Most radios utilized by public safety personnel require a Universal Device Connector (UDC) or other similar mechanism to enable the connection of handsets and other accessories. The UDC utilizes a plurality of electrical contact points arrayed around or near an attachment point integrated into the exterior of the radio, therefore enabling connection to and an interface for integration between the radio and the wired radio handset. A UDC, or other similar device, gives radios the ability to connect a microphone/speaker assembly, transmit signals (data, electrical, etc.) from handsets to the radio or vice versa, transmit voice communications and activate the emergency trigger on a remote device, among other capabilities. Through the use of a UDC or similar type device, public safety personnel can integrate radio communications technology with certain other devices, but the number of such devices is currently relatively limited.

The UDC is additionally often utilized as a connection point for connecting the radio to a computer or other device for purposes of programming, updating the radio software, configurations, etc. This UDC interface point is utilized to connect a data cable between the radio, the computer and/or another device.

The UDC interface or connection point is referred to by various names and nomenclature dependent upon the manufacturer. The UDC is additionally referenced by the following names: Radio Programming Connector, Aux Microphone Adaptor, Auxiliary Connector, Pin Connector, Microphone Cable Connection, Comm Port, Microphone Connector, Universal Connector, D Connector, Microphone/Speaker Accessory Connector, Radio Accessory Connector, etc. The term "UDC" will be utilized throughout this document as a generic term to describe any of the radio interface connection points as described herein.

Radios are built and programmed to transmit and receive signals and possibly other data including GPS coordinates and emergency trigger activation alerts. However, without a connection to an ancillary device to provide this critical information, radio communications are limited in their overall use.

It would be highly beneficial to offer a system wherein radio functionality can be combined with or tied into currently developing public safety technologies. An intuitive system that enables recording and/or archiving of events and facilitates communications and interactions that does not require significant additional equipment to be carried or maintained would be desirable.

SUMMARY

Thus according to the present design, there is provided a radio connection apparatus configured for use with a radio comprising an accessory connector arrangement. The radio connection apparatus comprises a radio connector configured to join with the radio accessory connector arrangement and a pouch connector configured to fixedly interconnect with a connector of a radio pouch such that removal of the radio from the pouch causes removal of the pouch connector from the connector of the radio pouch. The radio connector and pouch connector electrically interconnect with a processing device such that signals are transmitted between the radio and the processing device.

According to a further embodiment of the present design, there is provided a radio connector configured to connect a radio with a radio pouch and a processing device. The radio connector comprises radio connection hardware configured to connect the radio connector with the radio, and a pouch connector configured to fixedly interconnect with a connector of a radio pouch such that removal of the radio from the pouch causes removal of the pouch connector from the connector of the radio pouch. The radio connector and pouch connector electrically interconnect with the processing device such that signals are transmitted between the radio and the processing device through the radio connector and pouch connector.

According to another embodiment of the present design, there is provided a radio connection apparatus configured for use with a radio. The radio connection apparatus comprises a radio connector and a pouch connector provided with the radio connector and configured to fixedly interconnect with a connector of a radio pouch such that removal of the radio from the pouch causes removal of the pouch connector from the connector of the radio pouch. The radio connector and pouch connector electrically interconnect with a processing device via a belt wearable by a user such that signals are transmitted from the radio through electrical connections in the belt and to the processing device.

Various aspects and features of the disclosure are described in further detail below.

DETAILED DESCRIPTION

Figure 1:
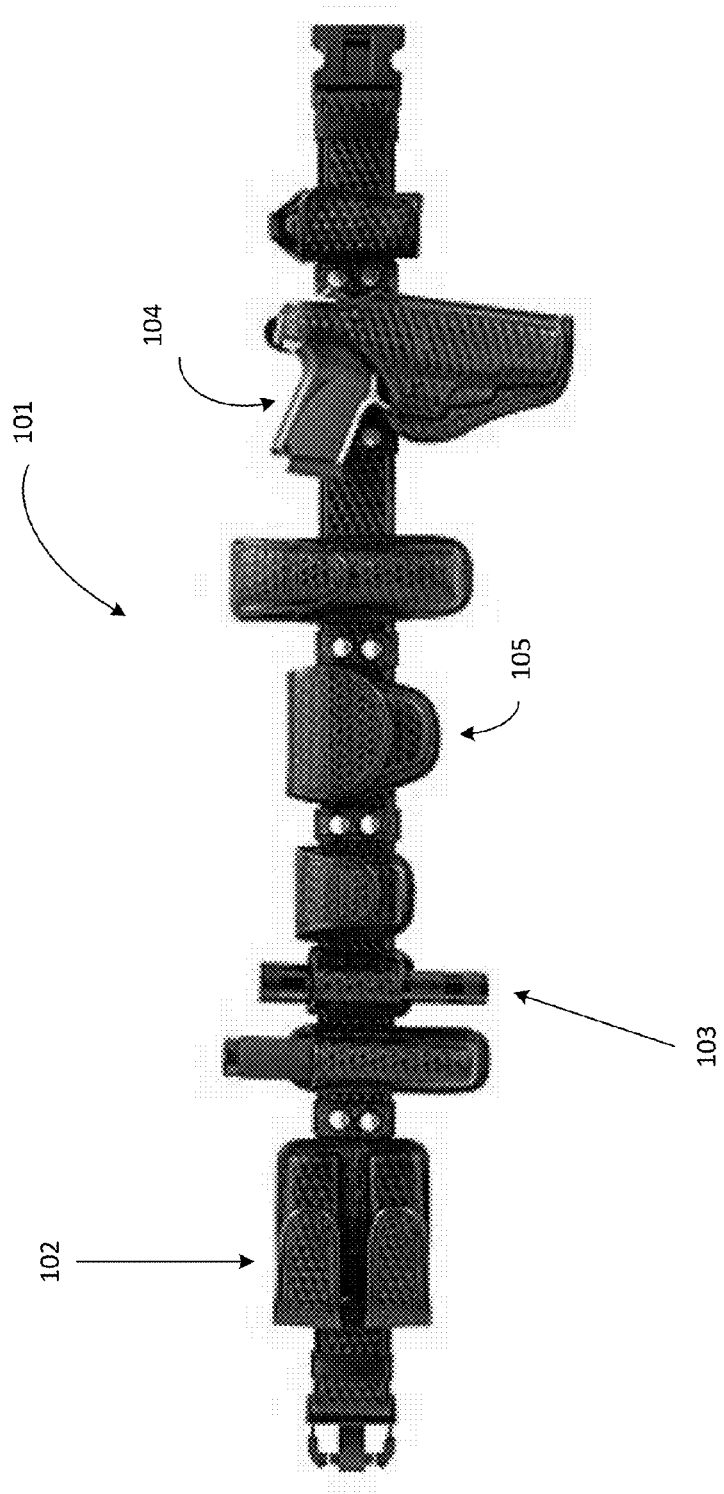
FIG. 1 shows an example of an existing police belt or officer's belt, including devices and receptacles.

The present design enables law enforcement, military, security officers, fire department personnel, corrections officers or other appropriate personnel to employ a police type radio device to automatically collect/record evidence, within their presence, without the need to manually or consciously initiate the recording. The recording system has the ability to process and/or automatically preserve audio and other data relating to the officer's use of his or her radio. In one embodiment, the present design comprises a connection between the radio and a duty belt worn on the officer's person, wherein the duty belt is configured to receive and provide an interface with a recording device that may transmit and receive information to and from a remote location.

The present design enables law enforcement, military, security officers or other appropriate personnel who utilize handheld radios to augment the existing capabilities of their radio systems and other body worn technology. The design integrates into video/audio recording devices, processors, sensors and other devices utilized by persons employing wearable technology. The present design incorporates various functions of the radio into a system whereby these radio capabilities may be integrated into wearable technology and record such actions or transmit them live to a remote location or entities as well as numerous other capabilities. Further, the present design incorporates radio functionality into the system, including an ability to strategically employ a standard or existing radio device.

As used herein, various terms are employed and are intended to be used in the broadest sense possible. For example, the present application uses the term "officer" or "law enforcement officer" or otherwise to indicate the individual employing the system, and such a term is meant to broadly encompass any individual who may have use for such a device or system, including but not limited to police officers, Fire Department personnel, military personnel, corrections officers, security personnel, or other interested individuals.

The present design typically includes a belt system, and contents of the belt described herein may differ, and different officers may employ different equipment. The officer may employ a holster that holds a handgun, a receptacle for a baton, handcuffs, radio, OC spray, a light source such as a flashlight, and a control device, but any type of appropriate item, such as an item utilized by law enforcement, security, military officers, etc. may be employed. Different devices may be used to record video and/or audio images, and/or store and transmit these video/audio images. With respect to recording devices, the term "camera device" is intended broadly to mean any type of recording device, typically a video and audio recording body mounted device, a video only body mounted device, an audio device, processor or other device. These are collectively referred to herein as a "recording device." Further, certain devices are described herein as being a single device while others are described as multiple devices, and it is to be understood that the invention is not limited to the devices described but single or multiple devices may be employed where multiple and single devices, respectively, are described, as long as the functionality described is performed. The foregoing and other concepts disclosed herein are intended to be interpreted broadly and not limit the scope of the present invention.

The present design includes a connection between a handheld radio system carried or worn on the body of an officer and an intelligent belt system capable of use in law enforcement, military, security, corrections, or any other industry requiring or benefitting from its use. Without modifying existing radio systems, the present design enables a network connection from a handheld radio device to the belt system through a USB, FireWire or other type of physical connection between the radio device, the radio holder or pouch and/or processor, recorder or other device contained on the belt system or the body worn network of the officer.

Virtually all body worn radios include an emergency activation trigger. The functionality of the emergency activation trigger provided, for example, with the body of the radio device may be integrated into the belt system so as to provide a trigger for activation of the recording device provided in and with the belt system, providing a notification of emergent status, transmission of GPS location, initiation of video streaming to a remote location such as a command center of Real Time Crime Center (RTC), and various other capabilities.

The present design provides a system whereby critical metadata can be included in the transmission of signals from the radio, including GPS coordinates or other critical information collected, using a belt system. The present design may additionally utilize Bluetooth, WiFi, Radio Frequency Identification Device (RFID) technology, commercial wireless or other wireless systems and capabilities to achieve various functions wirelessly. Activation of the belt system by the emergency trigger may also activate live streaming of video footage captured by the belt system for more effective response by public safety personnel.

One example of a belt system that may be employed with the present design is provided in U.S. patent application Ser. No. 14/620,748, entitled "Belt System for Use with Video/Audio Recording Devices," inventor Kresimir Kovac, filed Feb. 12, 2015, the entirety of which is incorporated herein by reference (the "'748 design"). In the '748 design, the belt is provided with a recording device configured to communicate with a recording device and a camera arrangement wherein the camera arrangement may be employed to record video and maintain and/or archive recorded video. Connections are provided to trigger video recording, wherein removal of a device from the belt causes a signal to be provided via hardwire connection to the recording device and causes special processing of the video.

Reference is further made to U.S. Provisional Patent Application Ser. No. 62/175,189, entitled "System for Managing Information Related to Recordings from Video/Audio Recording Devices," inventor Kresimir Kovac, filed Jun. 12, 2015, the entirety of which is incorporated herein by reference. The design presented relates to software functionality and recording management related to a device similar or identical to the '748 design.

FIG. 1 shows one example of a standard police belt from the prior art. Items may be secured in such a belt using a holster or pouch which is firmly attached, via a belt loop, to the outer duty belt or belt 101. Each pouch or holster typically utilizes a metal snap closure attached to a synthetic flap to secure the item inside the pouch. This flap or snap is generally part of some type of security retention system designed to securely hold the item of equipment on the belt until the officer deploys the item.

In order to remove an item from a pouch or holster, the officer must first unsnap the security flap, snap, strap, clasp or other retention system in order to remove the item. An example would be an officer unsnapping the retention strap on his/her handgun holster prior to drawing the firearm. The duty belt 101 may be constructed of different materials, including one or more layers of leather, with leather pouches or holsters. Other materials may be employed, such as nylon, plastic, Kydex, laminates, etc., and belts may be constructed of more than one type of primary material.

FIG. 1 illustrates various official devices and receptacles used in one instance of a duty belt 101, with devices including ammunition 102, flashlight 103, handgun 104, and handcuffs 105. The '748 design provides an interface between the duty belt 101 and the various pouches and holsters on the belt which enclose or maintain certain items and equipment. This interface electronically connects a recording device to the duty belt and the various pouches and holsters provided with the duty belt. When an officer intends to deploy an item of equipment, he/she first unsnaps the security flap/retention system of the pouch holding the item. This unsnapping action is a signal, called herein a "critical event signal" or "critical event indication," indicating a recording device should initiate with no further action required from the officer.

Figure 2:
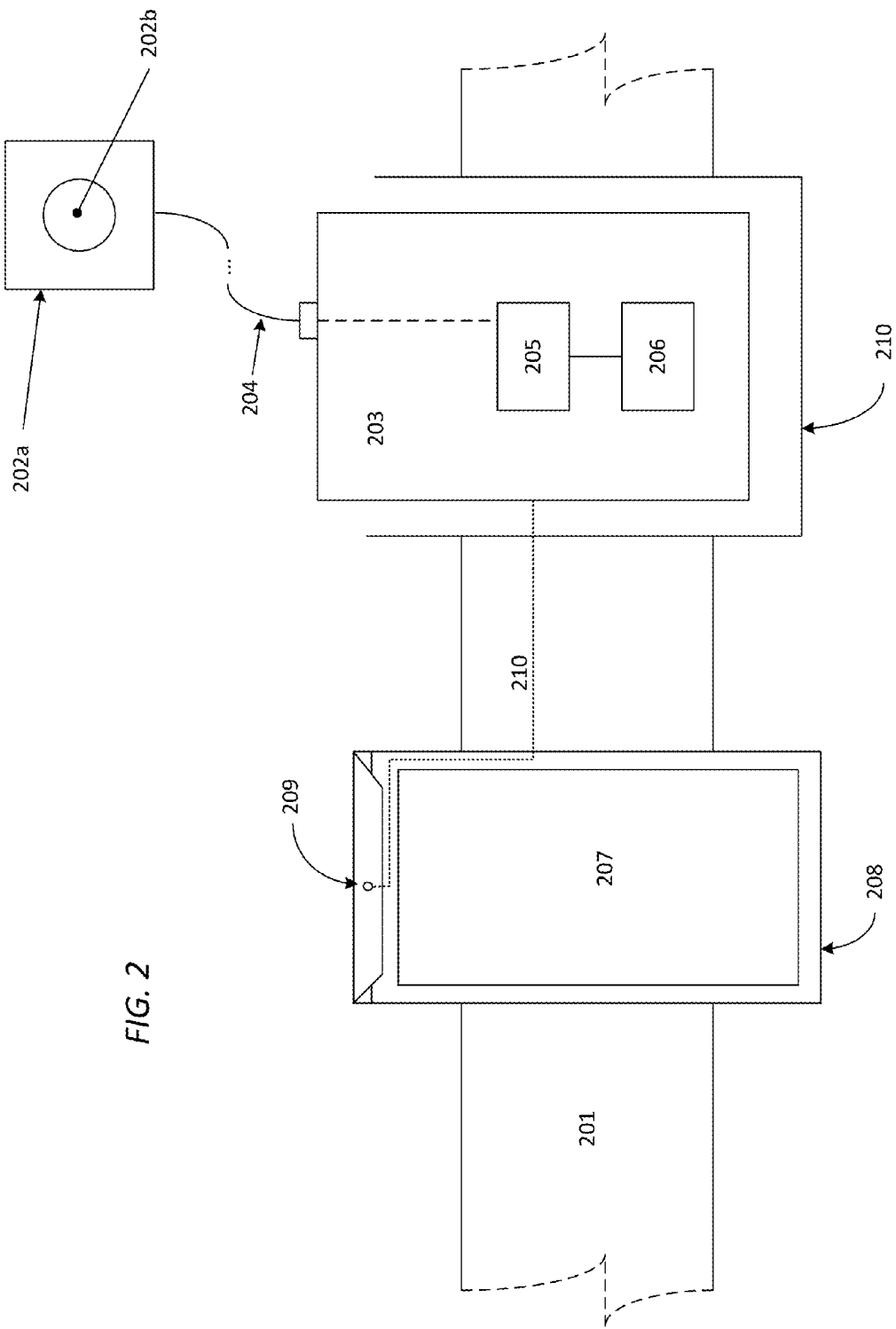
FIG. 2 is a conceptual representation of certain components used with the present system.

In FIG. 2, there is provided a police belt 201 and a recording device 202a, configured to be located on the officer's person and record video and/or audio images, including a sensor 202b in this embodiment. Signals are transmitted to a processing/storage device 203 such as by the wire 204 shown or wirelessly. Wireless transmission requires a transmitter connected to or provided with the recording device and a remote receiver connected to or providing signals to the processing/storage device 203 as described herein. Any of these components may be integrally formed in a single housing or may be separate components.

Processing/storage device 203, also representing a recording device, may include a processor 205, a storage device 206, and the processor 205 may be configured to perform the functions provided herein and other relevant functions. Processing/storage device 203 may be integrated into police belt 201 or may be provided separately with a separate storage compartment or holster provided on the police belt 201. Storage compartment/holster 211 is shown in this embodiment. Also shown in FIG. 2 is a holstered item 207, which may be a gun, for example, but any of the aforementioned devices, contained within a holster 208. Holster 208 includes a retention snap 209, and retention snap 209 is electrically connected in this embodiment to processing/storage device 203. A wireless connection or other appropriate connection may be provided at a point between retention snap 209 and processing/storage device 203. Electrical connection to retention snap 209 may be using any known means, including providing a small current through or voltage across the retention snap 209 such that the snap acts as a switch, providing a signal or value when closed and a different signal or value when open. Processing/storage device 203 may provide other functionality, such as monitoring noise levels to detect gunshots, and so forth. Although not shown in this view, one or both of processing/storage device 203 and recording device 202a may be provided with a switch (not shown) able to turn on and off recording of desired incidents.

While shown as a snap device, retention snap 209 may be any type of retention mechanism or means and may take other forms, such as a conductive strip or piece, a motion sensor in the holster 208, a light sensor in the holster 208 that senses a change in light received, such as when a holstered item is removed from the holster 208. Alternately, the design may include other means for establishing a critical event, such as a safety strip that operates so that removal of the holstered item 207 tears or otherwise compromises the strip, and compromise of the strip can be sensed indicating a critical event has occurred. Any other device or sensor or apparatus that can be used to determine the holster 208 has been opened and/or holstered item 207 has been removed may be employed.

When the system senses that holster 208 has been opened and/or holstered item 207 has been removed, an electrical signal is provided to processing/storage device 203, such as via line 210, and processing/storage device 203 senses the signal and determines that the holster 208 has been opened and/or holstered item 207 has been removed. Such an indication is a critical event signal, and upon sensing a critical event signal, processing/storage device 203 performs audio/video processing as described below.

Figure 3:
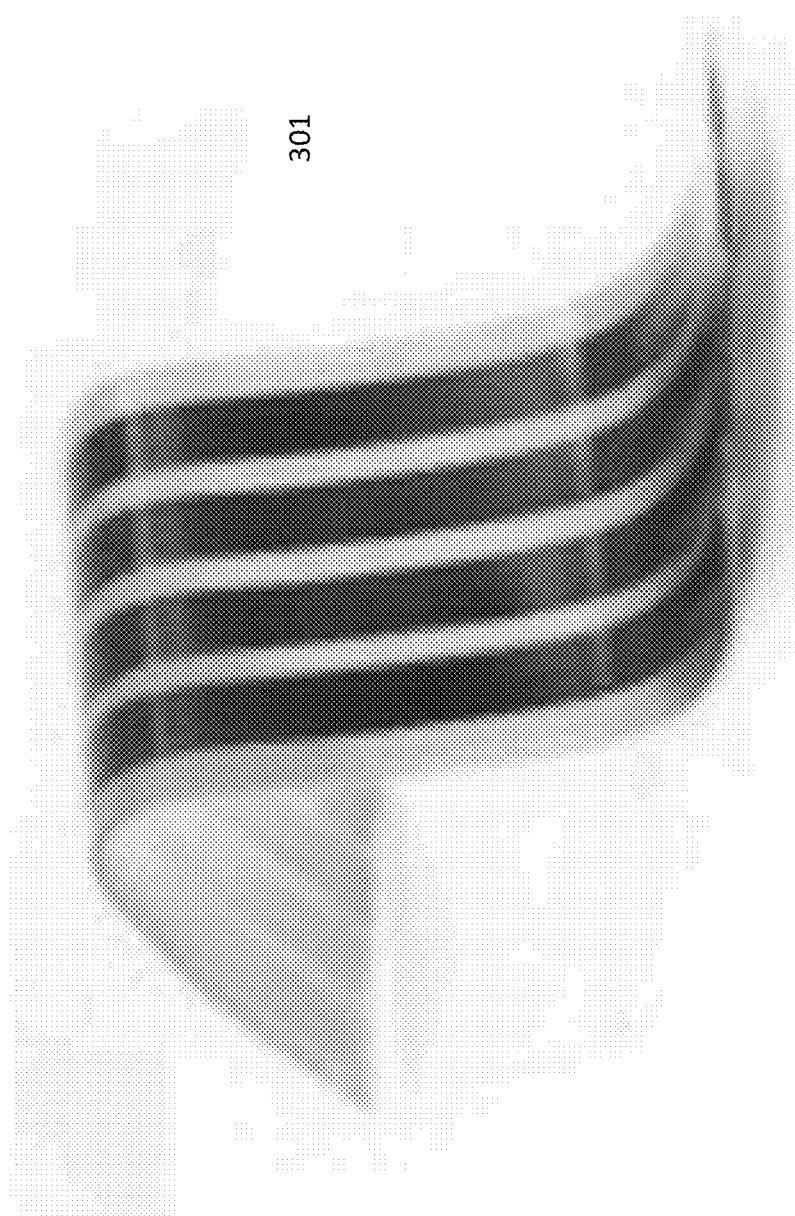
FIG. 3 shows tape having flat wires provided therewith that may be employed with the present design.

In the past, several pieces of nylon have been sewn, glued and pressed together to form the duty belt. A thin circuit type tape 301, such as is shown in FIG. 3, can be provided with, e.g. sewn into, the belt. The circuit tape 301 can possess multiple individual electrical lines/leads running through it. The circuit tape 301 is sewn into, fixedly mounted within or outside of the belt and may not be visible once the belt is assembled.

Figure 4:
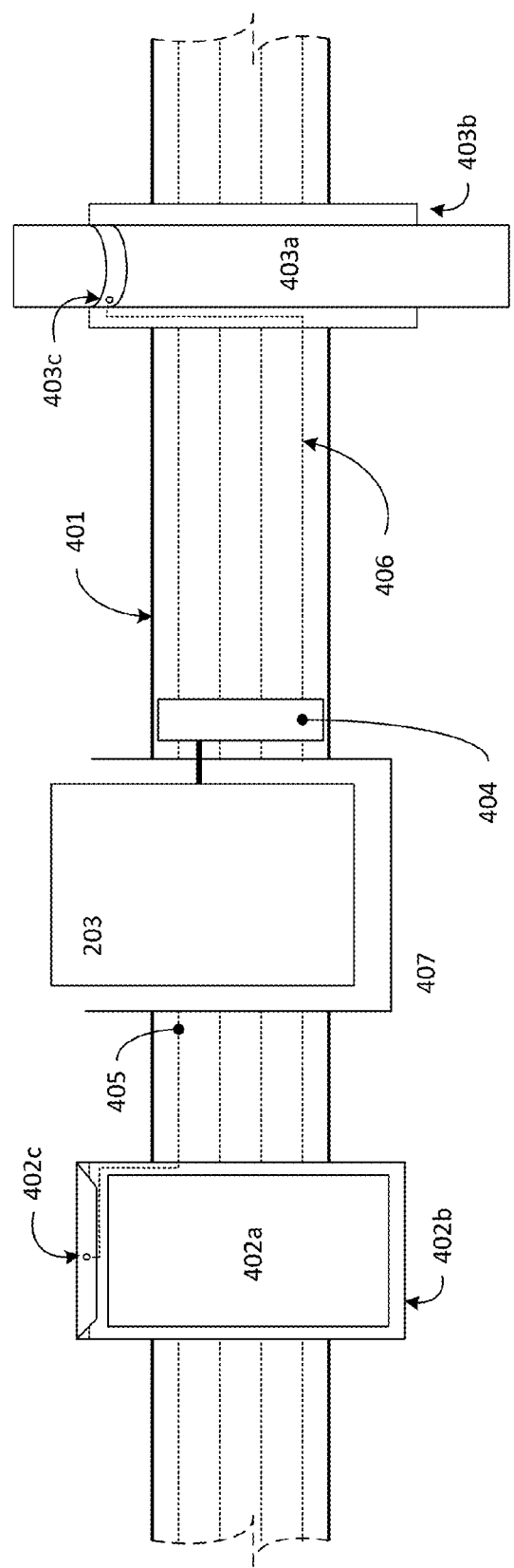
FIG. 4 illustrates interconnections using the tape of FIG. 4 including wires between various belt receptacles and the processing/recording device.

FIG. 4 illustrates the general use of thin circuit tape 401 or similar which may be sewn into belt 401. Two devices and two receptacles are shown in FIG. 4, device 402a and receptacle 402b, and device 403a and receptacle 403b. Electrical connections, such as grommets, snaps, or other appropriate devices are shown as electrical connections 402c and 403c. Processing/recording device 203 is shown, and in this view intermediate device 404 is provided, wherein intermediate device may be a transformer, signal booster, multiplexing cable, or any other intermediate device that facilitates providing electrical connections and indications from the receptacles and their components or connections to processing/recording device 203. A direct connection, without intermediate device 404 may be provided. From FIG. 4, receptacle 402b connects to wire 405 using electrical connection 402c, while receptacle 403b connects to wire 406 using electrical connection 403c, and wires 405 and 406 in this embodiment connect to intermediate device 404, which connects to processing/recording device 203, here housed in receptacle 407. Other implementations are possible, such as two or more receptacles using a single wire such that removal of any device constitutes a critical event and the processing/recording device 203 senses that a critical event has occurred. Such an implementation may not be able to record and/or document which device was removed from its receptacle. While a limited number of electrical lines are shown in FIG. 4, any number of lines may be provided, with some lines not employed to make an electrical connection. Additionally, different electrical lines may be utilized by different types of pouches or holsters. This would allow the system to know which item is being deployed based on the electrical lines (circuits) being broken or activated.

Figure 5:
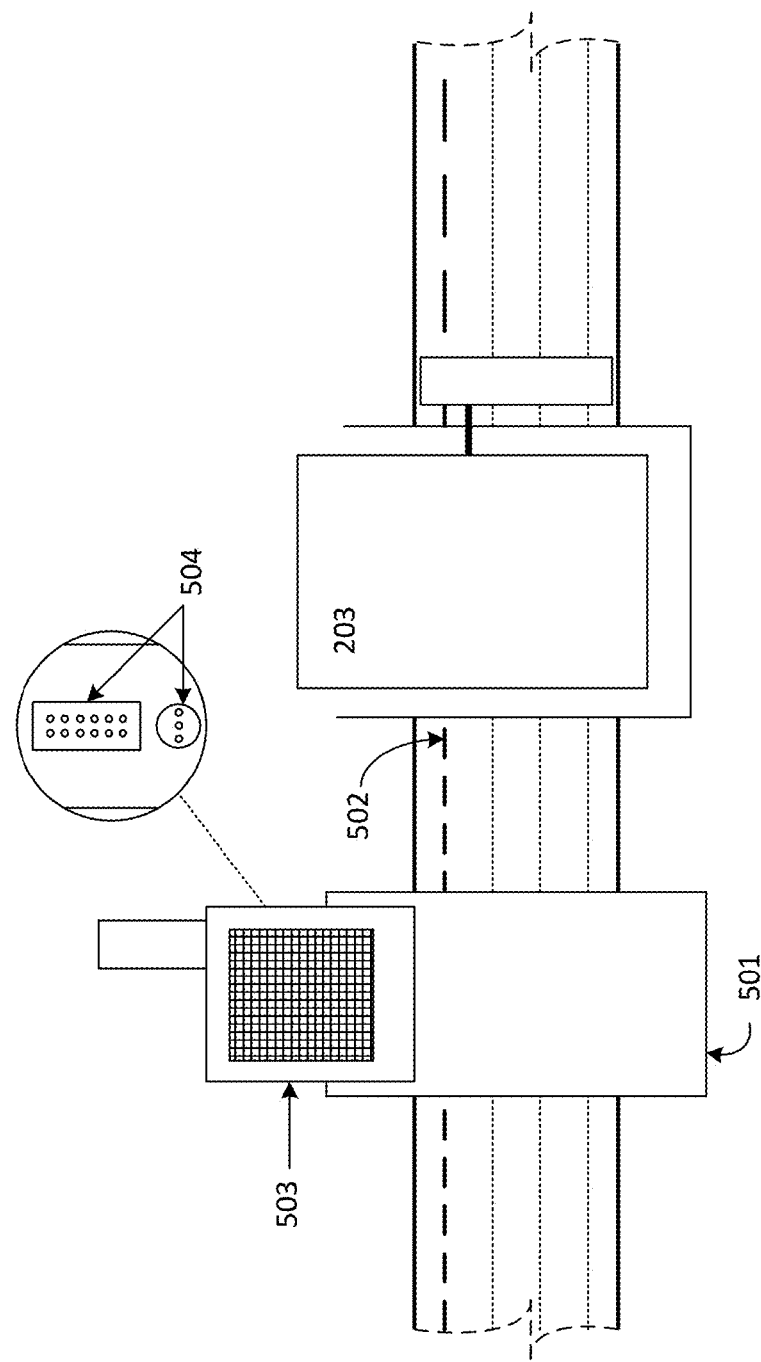
FIG. 5 is a representation of a radio used in accordance with the processing/recording device in the present design.

One such additional device that may be connected to the system is a radio device. FIG. 5 illustrates one embodiment of the belt 201 with a receptacle for a police or military radio. The connection to processing/recording device 203 may involve different connections than other components and/or holster connections provided on belt 201. For example, an officer deploying a weapon from a holster on the belt may cause the transmission of a signal indicating the holster is open. However, the radio device requires an ability to send signals back and forth to the radio, and thus a line supporting the transmission of all necessary signals contemplated is required, and may include a single hard wire, a multiplexed wire connection, or other appropriate wired connection. In FIG. 5, the connection from radio device holster 501 to processing/recording device 203 is shown as differing from the other connections, but this is not required—all wires may be of the same quality and may transfer signals of any type to the various components on the belt.

Holster 501 receives radio device 503 and radio device 503 interfaces with holster 501 and processing/recording device 203 via line 502. In this manner, signals may be conveyed to the radio device 503, audio or warning sounds may be played through the speaker in the radio device 503, and emergency signals from radio device 503 may be conveyed to processing/recording device 203 and emergency or other relevant signals may be conveyed from processing/recording device 203 to radio device 503.

Interface 504 between the radio device 503 and holster 501 is provided. The interface 504 may vary in construction and depends on the radio device employed. Current radios used in police work offer an accessory connection, and one example of an existing and extensively used class of radios is the Motorola TRBO radios. Motorola TRBO radios include a 12 pin connection as an accessory connection, and such a connection is shown in FIG. 5 as interface 504, wherein select pins may be used depending on the connection desired. A further representation of the Motorola TRBO radio connection, interface, or accessory connection is presented in FIG. 6, with 12 pin connection 601 and three pin connection 602 illustrated. The present design interconnects the various connections on the TRBO accessory connection port with a USB connector as shown in FIG. 7.

Figures 6, 7:
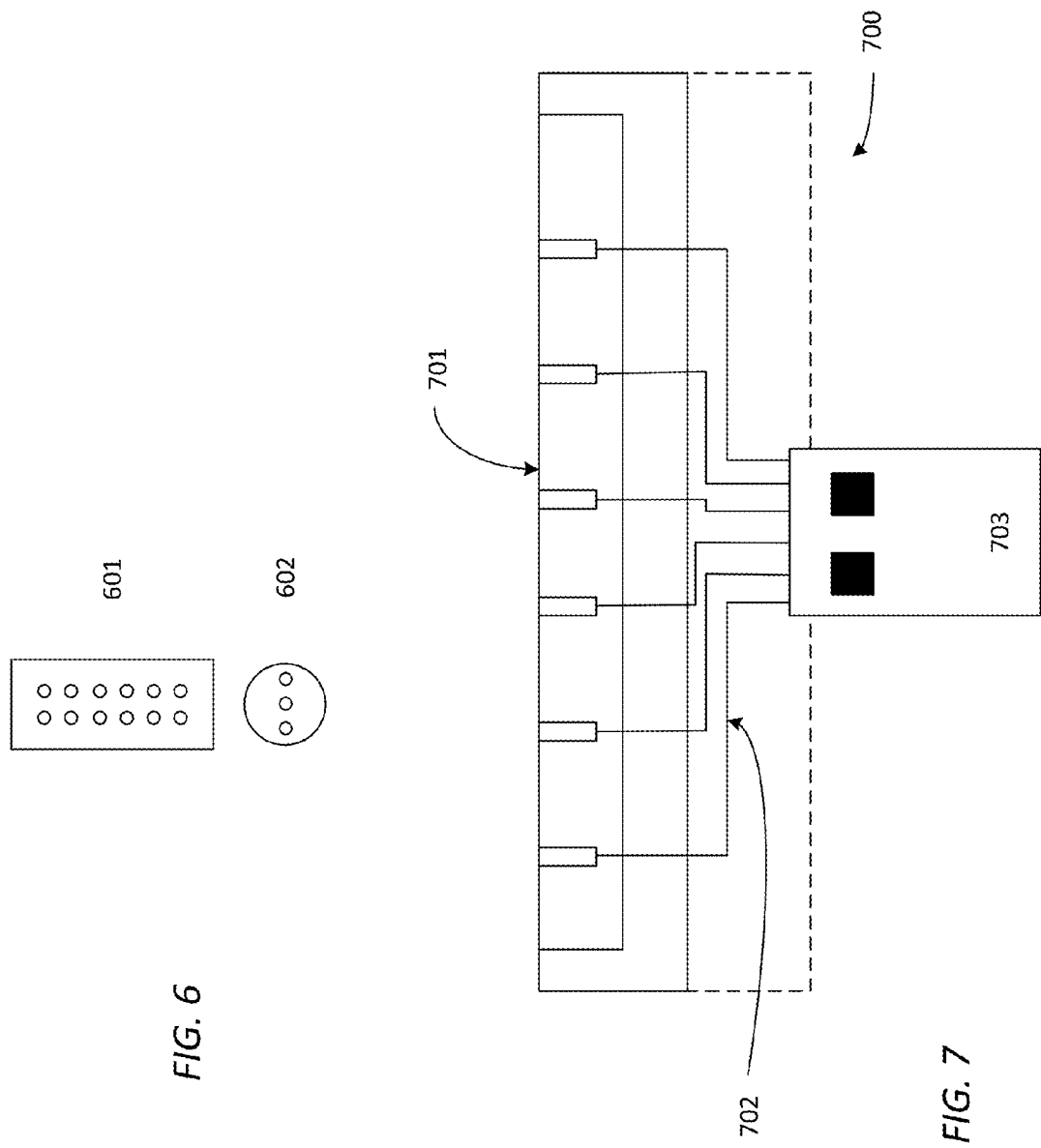
FIG. 6 illustrates an accessory connection for a Motorola TRBO radio.
FIG. 7 shows a conceptual representation of a UDC (Universal Device Connector) jack adapter in accordance with one embodiment of the present design.

FIG. 7 is a conceptual representation of a connector but other connector designs may be employed depending on the radio device and the desired receiving device, such as a USB receptacle. FIG. 7 is a conceptual representation of a connection between a 12 point Motorola TRBO accessory connection and a USB receptacle. Other connections (radio connection, receptacle connection) may be provided. From FIG. 7, radio connection receptacle 701 is provided in connector 700, with wiring and connections 702 to receptacle connection 703, here a USB connection. In this manner, various functions can be performed, including transmission of signals to the radio device, receipt of signals from the radio device, emergency indications to or from the radio device, providing a small amount of power, and an ability to record information received from the radio device.

Figure 8:
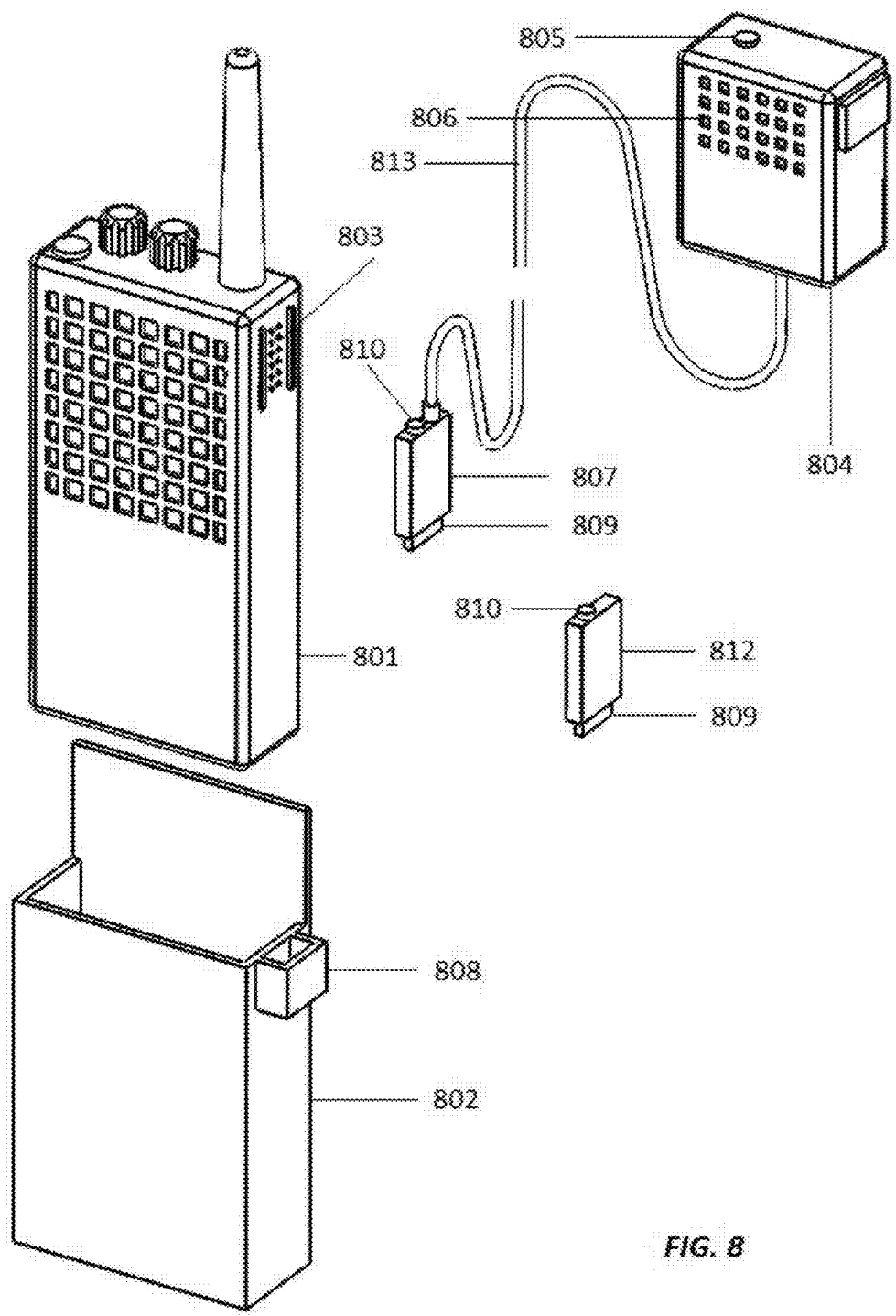
FIG. 8 illustrates use of a UDC jack adapter with a radio, pouch, and optional external microphone/speaker.

An alternate aspect of the present design incorporates existing capabilities of handheld radios worn on the body of an officer or soldier. FIG. 8 represents one such design. The radio 801 is generally carried in a pouch, holster, or receptacle 802, which is then attached to an officer's belt such as the belt described herein. The radio 801 can be withdrawn from the pouch 802 for normal use, or the pouch 802 containing the radio 801 can be removed from the belt for use as a combined unit (radio plus receptacle) without the radio 801 being removed from the receptacle 802. Radio 801 in this embodiment includes a Universal Device Connector (UDC) interface 803 or similar system. The UDC interface 803 in this embodiment includes a plurality of electrical contact points arrayed around or near an attachment point to the radio. The purpose of the UDC interface 803 is to enable the adding of an external microphone/speaker assembly 804, transmitting/receiving signals between the handset 804 and radio 801, integration of an emergency trigger button/switch 805 on the handset, integration of voice/data capabilities, integration of voice/speaker 806 capabilities in the handset 804, and other functions.

The remote handset 804 may be connected via a plurality of electrical contact points between the UDC interface 803 located on the radio and a UDC jack adapter 807 or the equivalent. The UDC interface 803 can be connected to a handset or jack adapter 807 at the plurality of electrical contact points provided as UDC connector 803 or can communicate using other devices or interfaces such as a hard wire, USB, FireWire, Ethernet, wireless, Bluetooth, RFID, WiFi, etc. or any other method. The radio handset 804 may be connected to the radio body 801 via a wired connection or wireless such as Bluetooth, RFID, WiFi, etc.

Different UDC connectors may provide different arrangements of contacts or connection points. In one UDS configuration, connections such as EXT SPKR+ (external speaker positive), EXT SPKR− (external speaker negative), Option B+, External microphone, optional select 1, optional select 2, ground, transmit data, receive data, RSSI, transmit/receive audio, boot control, and N/C (no connection) may be provided, while in another optional select 1, external speaker, external microphone, Option B+ (BT program select), optional select 2, speaker communication, ground, LH busy/KID/Data In, VPP/CTS, Boot Program Receive/Transmit Data, Mode control, and LH Data (Key/Fail) may be provided. Any of the devices disclosed herein are provided to interface with the receiving UDC such that full functionality is provided. Other connections, such as so-called "D" connections, etc. may alternately be provided, and the functionality described herein is provided with such designs.

The present design does not necessitate modifying many existing radios that include a UDC interface 803 or similar interface that allows for additional functionality. The present design includes a specialized UDC jack adapter 807 or similar which can be connected to various commercially available radios via the radio's integrated UDC interface 803. The UDC jack adapter 807 may be permanently mounted, semi permanently mounted or have a quick disconnect functionality. The UDC jack adapter 807 design in this embodiment encompasses a connection system that interfaces with a similar connection built into a radio pouch, radio clip, radio holster or other method of carrying a radio on the person of an officer. The UDC jack adapter 807 is preferably rugged, non-obtrusive, waterproof, and readily interfaces with the radio pouch 802. This interface allows various functionalities of the radio 801 to be transmitted via the UDC connector 803 to various systems outside of the physical construct of the radio 801 to include but no limited to a body worn network, processors, body worn camera, sensor or other devices.

The radio pouch 802 may include a hard mount for a radio pouch interface 808, here a USB connector, on the outer or inner portion of the radio pouch 802. Radio pouch interface 808 lines up and interfaces with connection 809 on the UDC jack adapter 807. The UDC connection 809 on the radio pouch 802 is connected to the radio holster belt mounting system via a wired system, wireless system or any other means. Such a connection allows the radio 801 to be connected to the UDC jack adapter 807, and UDC jack adapter 807 is connected to the radio pouch interface 808. Radio pouch interface 808 is connected to the radio pouch belt mounting system, and the radio pouch belt mounting system is connected to a police duty belt which may include a processor and/or body worn camera. As illustrated, the present design encompassing a UDC jack adapter 807 with an interface 809 to a radio holster or pouch 802 provides the capability of integrating various capabilities of a standard radio into a networked infrastructure on the person of an officer.

The present design may include a variation wherein the UDC jack adapter 807 is equipped with a switch, button, node, toggle, sensor, etc., in the body of the UDC jack adapter 807 or another connected area, referred to herein as UDC emergency trigger switch 810. The button 810 is electrically connected to the electrical points of the radio's UDC connector 803, such as the 12 points on the Motorola TRBO accessory connection, in order to transmit/receive emergency trigger activations. The switch is herein referred to as a UDC emergency trigger switch. Such a switch enables an officer to activate the UDC emergency trigger switch 810 on the UDC jack adapter 807 thereby activating the emergent distress notification built into the capabilities of the radio 801. This UDC emergency trigger switch 810 functions in a capacity similar to an emergency trigger activation switch 811 currently provided in the body of the radio 801 or in external radio handsets having emergency trigger switches 805. The UDC jack adapter button 810 may also simultaneously or near simultaneously transmit a signal to the processor and/or body worn camera carried by the officer. This signal may be transmitted through the UDC connector 803 to the radio holster 802 and then through the network to the processor and/or body worn camera/recorder.

Again, the processor may be provided in or as part of a processing/storage device such as processing/storage device 203.

The UDC emergency trigger switch 810 may include a safety mechanism such as a secondary button, button cover, and may include a requirement to depress the button for two (2) continuous seconds, etc. in order to prevent inadvertent or accidental distress activations or notifications. The use of the UDC emergency trigger switch 810 may not circumvent or disable any emergency trigger switch 811 currently built into or embedded into present radio designs 801. Such functionality may optionally be provided if desired.

The UDC jack adapter 807 when connected to radios with a UDC connector 803 (or similar) provides an emergency trigger activation functionality. Using this functionality, the radio transmits an emergency indication and may concurrently or nearly concurrently transmit such an indication to a remote location such as a processor or similar device worn on the person of the officer, or to a remote receiver via such a processor or similar device. If a radio 801 was not manufactured with an emergency trigger button 811 or similar hardware capability, the addition of a UDC jack adapter 807 to such a radio 801 can provide emergency trigger functionality, provided the officer was wearing or somehow associated with a processor or similar device that had the capability of remotely transmitting such a signal. If the radio 801 was not manufactured with such functionality, the process of depressing the UDC emergency trigger switch 810 on the UDC jack adapter 807 creates a similar effect via the networked processors and/or devices having similar wireless transmission capabilities on the officer.

The UDC jack adapter 812 may be a device including a network connection 809 to an interconnected radio pouch 808. Such a network connection 809 interconnects the functionality of the radio 801 to a processor, body worn camera or other device on the person of the officer, such as with the belt design provided herein. The UDC jack adapter 812 may also encompass an emergency trigger switch 810 that provides a distress signal to a remote location such as a police command center via the radio's transmission capabilities as well as the networked processor, body worn camera or other device worn by the officer.

The UDC jack adapter 807 may also include a remote radio handset 804 connected via an electrical wire system 813 to the UDC jack adapter 807. The radio handset 804 may provide the officer with the ability to use the radio handset 804 to transmit/receive various functions of the radio 801. The handset 804 may also have an emergency trigger switch or button 805 built in that may provide the capability of sending a distress signal as previously described. The handset 804 may have other capabilities and functionalities networked to the radio 801 via a wired connection 808 and to the processor, body worn camera or other device worn by the officer. The handset 804 may have a wireless connection to the UDC jack adapter 807 wherein signals are transmitted or received via Bluetooth, WiFi, RFID or any other means.

Figure 9:
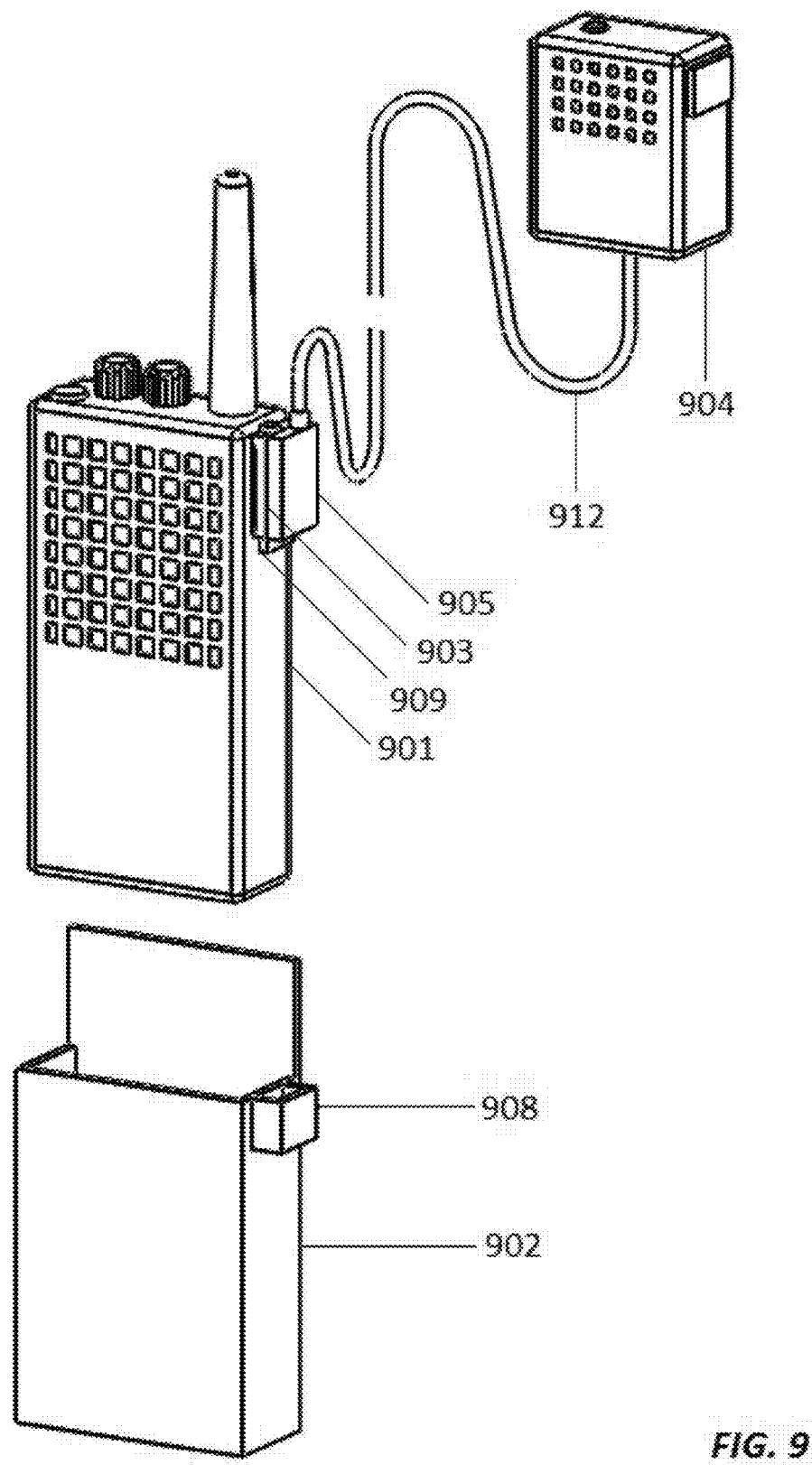
FIG. 9 shows a UDC jack adapter used with an external microphone/speaker having a particular interface component used with a UDC jack adapter of the present design.

FIG. 9 represents another version of the design, utilizing the UDC connection built into the housing of the radio 901 and any current UDC jack adapter 901 for the radio 901 even in circumstances where UDC jack adapter 901 does not have a connection point 909 to interconnect into the radio pouch 902. Generally, configurations involve a standard radio 901 equipped with wired handset speaker 804 connected to the radio 801 via a standard jack adapter 901 to the UDC 803.

In this variation of the design, a UDC space adapter 903 is added to the radio 801 thereby connecting to the radio's UDC space adapter 903. This UDC space adapter 903 has a UDC mounting point 902 on its exterior, allowing attachment to any standard UDC jack adapter 901. The UDC space adapter 903, as described, is equipped with a plurality of electrical points that interconnect with the UDC space adapter 903 of the radio 901 and the connection point of the UDC space adapter 903. The UDC space adapter 903 acts in the capacity of a relay or bridge for all connections, transmissions or received signals between the radio 901 and the radio handset 804 (or other device) connected to the UDC space adapter 903.

In this embodiment, the UDC space adapter 903 has a connection point 909 between the UDC space adapter 903 and the radio pouch 908. The UDC space adapter 903 is "sandwiched" between the radio UDC connection point (not shown in this view) and the standard UDC jack adapter 905. The radio pouch 902 is connected to the networked processor(s), body worn camera (BWC), or other device as previously described. Such a connection allows the radio 901 and radio handset 904 (or other device) to be interconnected into the body worn network, processor, BWC or other devices while still utilizing a stock radio body and a stock radio handset with stock UDC jack adapter 901.

The UDC space adapter 903 may be a hard device connected to the side of the radio 901, a thin membrane placed between the radio UDC connection point and the UDC jack adapter 901 of a radio handset 904 or similar device or any other design. Radio handset 904 is connected to UDC jack adapter 905 by wired connection 912. The UDC space adapter 903 may also incorporate an emergency trigger activation switch function or other capabilities, integrated into the functionality of the radio 901, body worn network, body worn camera, sensors or other devices.

Figure 10:
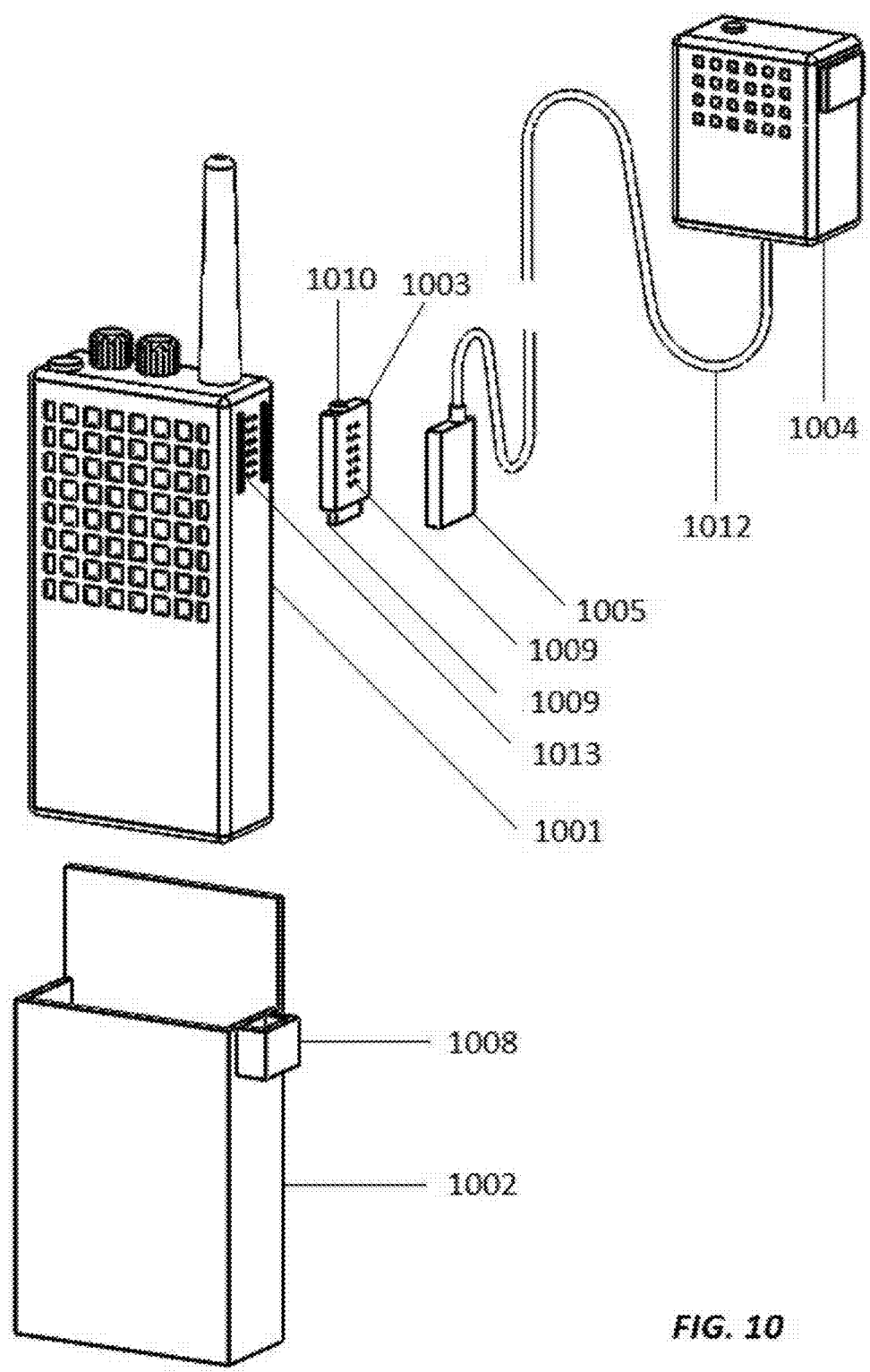
FIG. 10 is a representation of the components of FIG. 9 separated from one another, including the UDC jack adapter and the particular interface component of the external microphone/speaker.

FIG. 10 illustrates an expanded view of the elements of FIG. 9, including UDC space adapter 1003, radio 1001, UDC connector 1013, radio handset 1004, wired connection 1012, UDC jack adapter 1005, connection 1015, USB connector 1009, pouch 1002, and receptacle 1008. Alternate emergency button 1010 is also provided.

The system may utilize Bluetooth, WiFi, RFID, commercial wireless, or any other wireless system. The purpose of the wireless capability is to allow a wireless connection to various devices, computers, processors, etc. worn on the person of the officer, worn on the person of officers nearby, provided in vehicles, on computers, in infrastructure based systems, or in or with any other device. This wireless capability may be augmented if, for example, the UDC jack adapter is hardwired or interconnected directly to a network system worn by an officer as described above.

Figure 11:
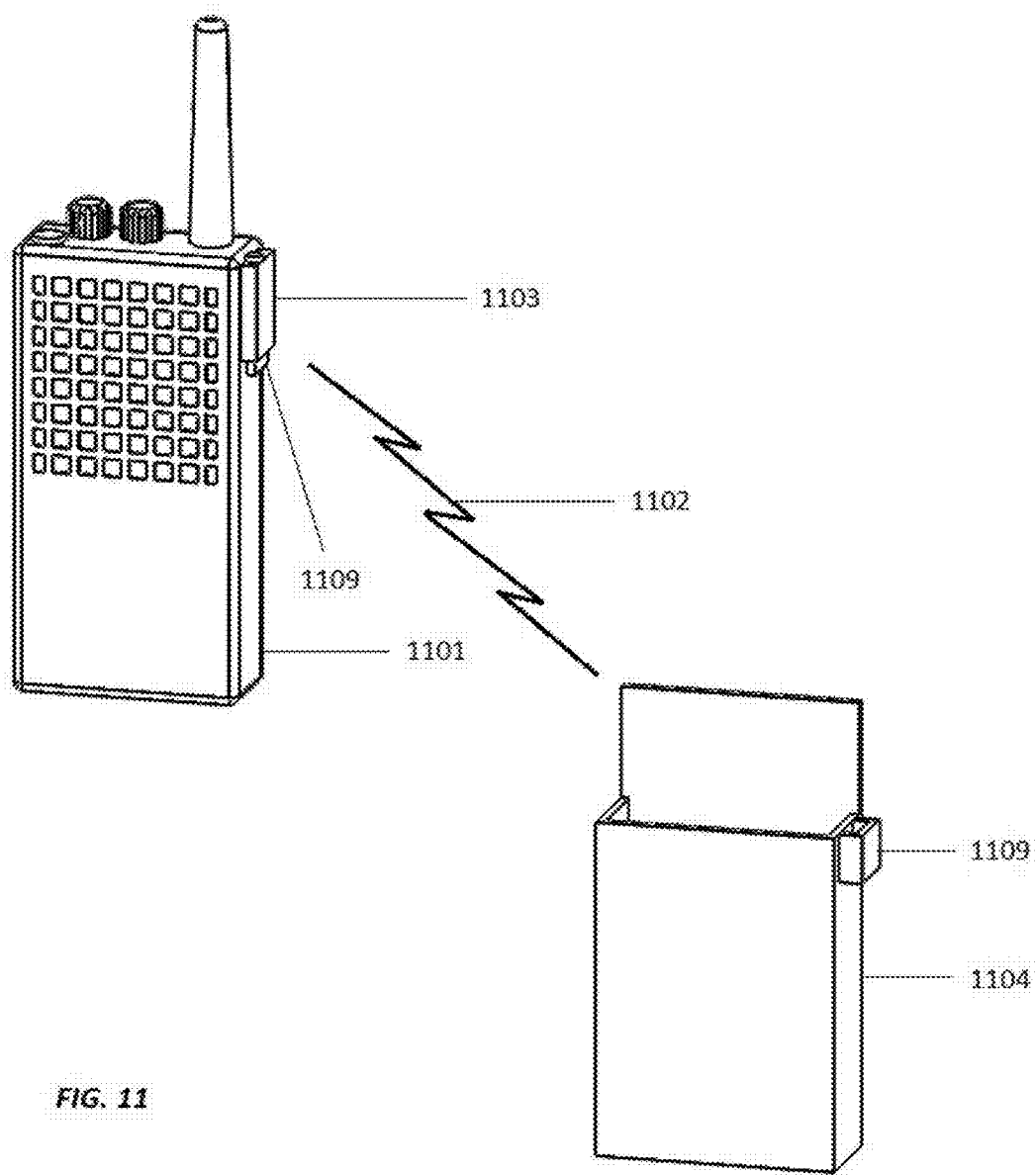
FIG. 11 shows remote transmission between the radio and the pouch using the UDC jack adapter.

FIG. 11 shows an embodiment with wireless transmission capability, such as Bluetooth. From FIG. 11, the present design provides the capability for the radio 1101 to be interconnected into the body worn network (belt and other related and/or peripheral devices) in a wired fashion when placed inside the interconnection 1108 on the radio pouch 1102. The design may switch to a wireless connection 1102 when the radio 1101 is removed from the radio pouch 1104 (thereby breaking the wired connection).

This wireless connection 1102 between the UDC jack adapter device 1101 and the radio pouch 1102, body worn network of the officer, processor, body worn camera or other device is of importance if the radio 1101 is not directly connected to the body worn network of the officer. For example, the radio 1101 could be connected to the body worn network of the officer when the radio 1101 is placed inside the officer's radio pouch 1102 with a connection 1108 to the UDC jack adapter 1103 of the radio 1101. If the officer removes the radio 1101 from the radio pouch 1102, this direct electrical/data connection is then severed and the electrical/data connection is lost. In such a case the present design allows for an immediate wireless connection 1102 to be established between the radio 1101 via the UDC jack adapter 1103 and the radio pouch 1102, body worn network, processor, body worn camera, police vehicle, server, or any other device. This design allows for the radio 1101 to maintain a connection with the body worn network, radio pouch 1102 or other system whether the radio 1101 is physically connected to the radio pouch 1102 or not.

The present design also allows for this wireless connection 1102 of the UDC jack adapter 1103 to allow for additional system capabilities near the officer. For example, this wireless connection 1102 could integrate into the wireless capabilities of the police vehicle or nearby officers who also possess a body worn camera, processor, body worn network, etc. on their person.

The present design also encompasses wireless capabilities which may be integrated into the radio 1101. For example, a radio 1101 that integrates Bluetooth, RFID, Wi-Fi, other wireless systems may allow for the radio 1101 to wirelessly connect directly to the body worn network of the officer which may expand the capabilities of other systems worn by the same officer.

The present design provides the capability of interconnecting/intercepting signals received/transmitted via the police radio 1101. These signals are networked via the connection to the radio pouch 1102 and therefore networked to devices worn on the body of the officer. These devices include but are not limited to processors, body worn cameras or other devices. The processor and/or body worn camera would therefore have the capability of recording all radio traffic received or transmitted by the radio 1101 as long as it remains interconnected to the network worn by the officer. This connection may be wired via the connection 1108 between the UDC jack adapter 1103 and the radio pouch 1102 or wireless via the wireless capabilities inherent in the radio and/or the UDC jack adapter 1103. The processor or body worn camera may integrate the radio traffic and various metadata into its recordings.

Most portable radio systems utilized by government agencies are configured so that the majority of the transmissions and receipt of transmissions occur via a duplex radio system. In such a configuration, a portable radio 1101 transmits to a repeating tower or antenna. The transmission goes from this radio antenna infrastructure to a central point whereby radio communication systems record and route the transmission to the relevant areas. This type of system allows for a large radio network whereby the transmission is able to be transmitted over extended distances and managed more effectively. All such transmissions may be recorded by the communications center. Transmissions in this view are represented by transmission 1102. These portable radios also have the capability of transmitting in "direct" mode. In direct mode, the radio 1101 essentially does not utilize a repeating system and therefore does not connect via a centralized radio communications management center. In direct mode, a radio 1101 becomes a radio-to-radio system similar to a walkie-talkie. In direct mode, the radio 1101 has a limited range as the radio 1101 is transmitting and receiving directly from another radio 1101 nearby. The issue from a management perspective is that such transmissions often cannot be recorded as they do not connect to a central communication center.

Modes of certain existing radios include both a duplex mode and a direct mode. The embodiment of FIG. 11 allows the processor or body worn camera to record all radio traffic whether the radio 1101 was set to duplex mode or direct mode. In many government agencies, only communications over "duplex" mode are recorded while "direct" communications are not.

The radio 1101 worn by the officer may be integrated into a body worn network via the connection 1109 between the radio 1101 and the radio pouch 1108. This connection allows for voice data, electrical signals, metadata, etc. to be exchanged between the radio 1101 and any processor or body worn recorder worn by the officer.

In the present design, a connection to the body of radio 1101 via a UDC jack adapter system allows for all transmissions sent or received to be recorded via the network processor, recording device or other device carried on the person of the officer. Such recordings may be accomplished using a UDC jack adapter 1103 connected into the radio pouch connection 1108, in turn connected via the network to the processor, recording device, or other device.

The present design also includes Global Positioning Satellite (GPS) data, either received from or transmitted to the radio 1101. GPS data functionality (receipt and/or transmission) may be integrated into or provided by the radio 1101 via the network connection between the radio 1101 and the radio pouch 1104 for other devices previously noted. The GPS data may then be transmitted to a remote command center from the radio 1101 and/or transmitted via the processor, body worn camera or other device worn by the officer. Additionally the GPS metadata may be recorded onto the processor or body worn camera of the officer.

In another embodiment of the present design, existing or new radio manufacturers may modify existing designs to integrate a direct connection between the radio 1101 and the radio pouch 1104 or other radio holder. This connection may be integrated via the UDC connection, the UDC jack adapter 1103, a wired connection, the radio's battery, the body of the radio 1101 or any other portion of the radio. The purpose of such a connection is to connect to the radio pouch 1104 or holder to the body worn network of the officer (such as a networked duty belt), to a processor, BWC or other device. Corresponding interfaces may be built into radio pouches so the radio may be interfaced with a body worn network.

A UDC adapter may be built into the radio pouch 1104 or radio holder directly without the use of a UDC jack adapter 1103. In this configuration, when a radio 1101 is placed inside the radio pouch, the UDC connections built into the body of the radio 1101 line up with the UDC connection built into the radio pouch. As a result, the UDC connections of the radio 1101 interconnects or interfaces with the UDC connections of the pouch connected to the body worn network of the officer. The radio 1101 is as a result connected to a processor, BWC or other device carried by the officer.

Many police agencies utilize portable radios without a remote handset microphone/speaker 1104 connected to the body of the radio 1101. This construction requires an officer remove the radio 1101 from the radio pouch in order to manipulate the radio 1101 or transmit information. Typically, the radio 1101 is left inside the radio pouch which is secured to the officer's belt when the officer is not transmitting. Generally, the officer will keep the radio 1101 secured inside the radio pouch on the belt while the radio 1101 is continuously receiving radio traffic (transmissions from other persons). The speaker of the radio 1101 is generally built into the front side of the radio 1101. The radio 1101 is generally carried in a radio pouch secured to the left or right side of the officer's belt. As a result, this position of the radio 1101 can make it difficult for the officer to hear radio transmissions from other person(s) as the radio speaker 1201 is pointed away from the officer's body at an approximate ninety (90) degree angle and is generally at least 24 inches or more from the officer's head/ears.

Figure 12:
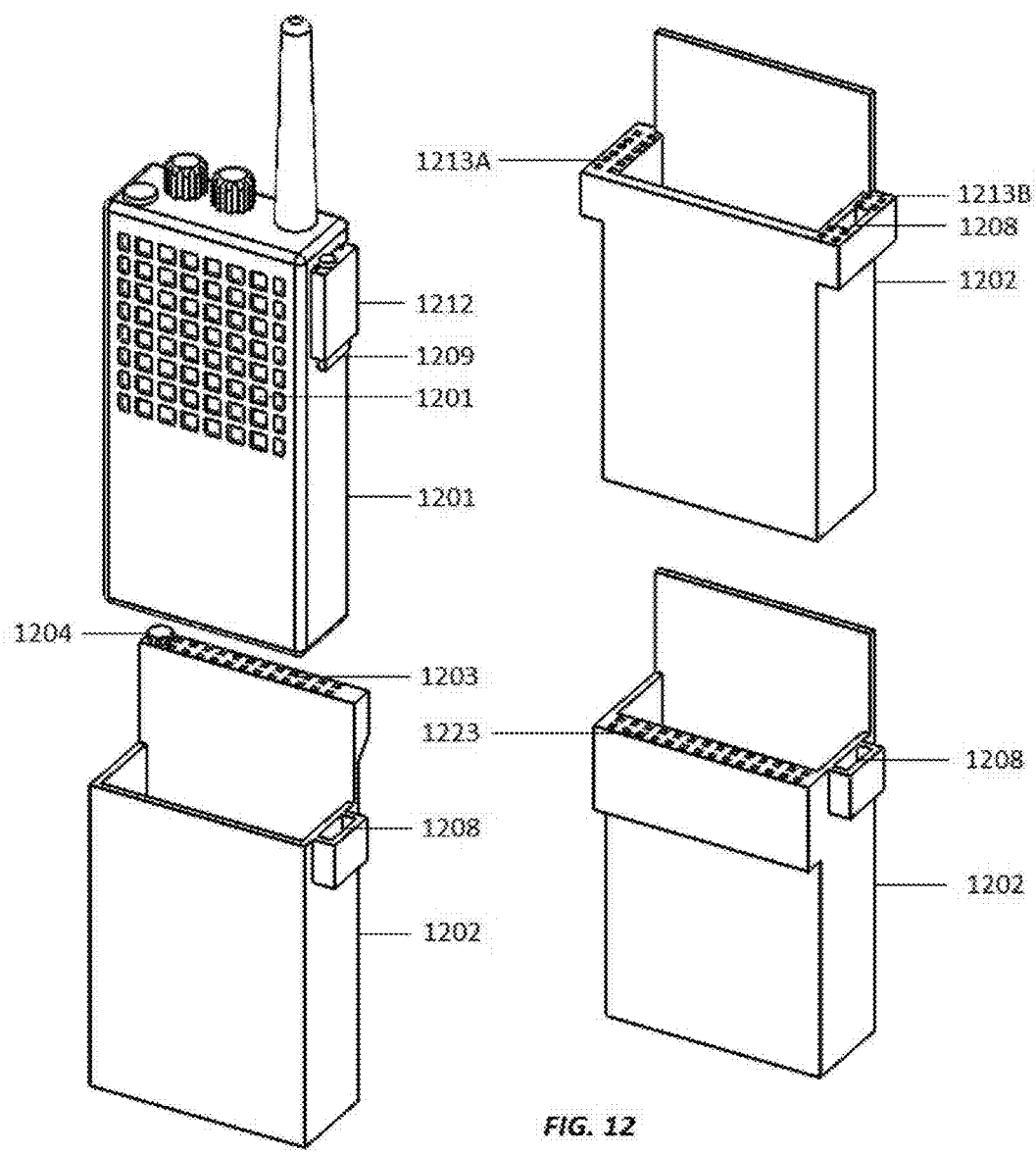
FIG. 12 illustrates various speakers used with the present design, typically with or offered on the radio pouch.

FIG. 12 illustrates a radio used with different pouches and different speaker configurations. FIG. 12 shows a UDC jack adapter 1212 which integrates via a receptacle 1208 into radio pouch 1202. Connection 1209 allows signals to be transmitted to/from the receptacle 1208 and radio pouch 1202 to the radio or vice versa and may include radio transmissions received by the radio 1201 or other communications, information, or data. The purpose of the UDC connection on the body of the radio 1201 is to transmit signals to a secondary speaker located on a radio handset or similar device. In this design the radio pouch 1202 has a connection 1208 which would interface with the UDC jack adapter 1209 of the radio 1201. The radio pouch 1202 may also have a radio speaker 1203 integrated into or attached to the body of the radio pouch 1202. Whenever the radio 1201 with attached UDC jack adapter 1212 is placed inside the interconnected radio pouch 1202 with integrated speaker(s) 1203, all received radio transmissions are played on the radio pouch speaker 1203 and not on the integrated speaker 1211 of the radio 1201. When the radio 1201 is removed from the integrated pouch 1202 with speaker 1203, the received radio transmissions may revert to the integrated speaker 1211 of the radio 1201.

The pouch speaker 1203 may be positioned on top of the radio pouch 1202, on one or both sides, or any other location or combination in order to provide acceptable sound to the officer carrying the radio 1201 on his/her belt. The radio pouch speaker 1203 may have a volume dial 1204 or switch to allow for volume adjustment while in the radio pouch 1202. This would allow for the radio 1201 to be set at a higher volume due to the extended distance from the officer's ear, such as 24 inches or more. When the radio 1201 is removed from the radio pouch 1202 (with integrated speaker 1203), the radio 1201 defaults or switches to the internal speaker 1211 built into the body of the radio 1201 and revert to the previously set volume of the radio. An officer may want the volume of the radio 1201 to be lower when outside of the radio holster 1202 due to the closer distance of the radio 1201 to the officer's head.

FIG. 12 includes various speaker orientations. In the lower left, speaker 1203 is shown at a top of the holster 1202. In the upper right, speakers 1213A and 1213B are shown at the side of holster 1202 with receptacle 1208 provided. In the lower right, speaker 1223 is provided in a forward orientation.

Figure 13:
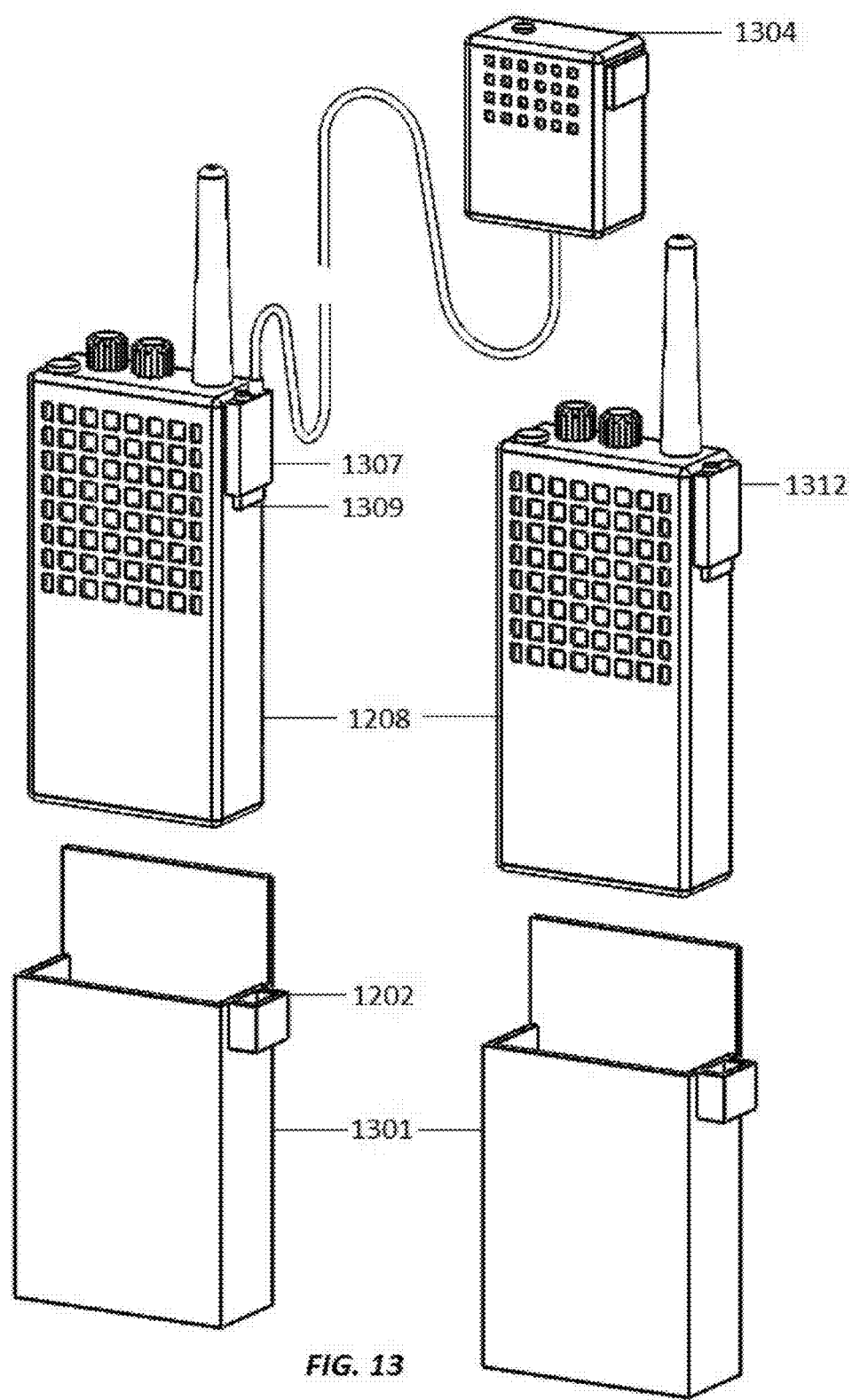
FIG. 13 shows the various components of the present design where the UDC jack adapter offers connection capability to the external microphone/speaker.

Another embodiment of the present design, shown in FIG. 13, provides the officer the capability of plugging in an external speaker, radio earpiece, bone conduction speaker, etc. into the interconnected radio pouch 1302, networked duty belt, processor, UDC jack adapter 1312, or other device. A secondary external speaker may be placed closer to the officer's head or ear allowing for a lower overall volume and increased sound clarity. When the officer places the radio 1301 into the interconnected holster 1302, the radio 1301 switches speaker functionality to the remote speaker. When the officer removes the radio 1301 from the pouch 1302 (to transmit for example), the radio 1301 may revert all functions to its internal speaker/microphone (not shown; located inside the body of the radio 1301).

Another aspect of the design involves various radio cradles, radio carriers, mounts, connections, etc. networked into various locations such as vehicles, buildings, computer systems, etc. When the radio 1301 with UDC jack adapter 1312 is placed in such a networked cradle, the radio 1301 becomes interconnected to the system.

This design enables the officer to take a modular approach in how the radio 1301 integrated with the UDC jack adapter 1312 can be utilized. The radio 1301 may be placed inside a networked cradle or other method as described and still maintain connectivity with the body worn network of the officer via a wireless system such as the transmission 1102 in FIG. 11.

The wireless system as described may be connected via Bluetooth, RFID, Wi-Fi, commercial wireless, or any other wireless system. This allows the radio 1301 to additionally relay recorded information, streaming video, metadata, radio transmissions, etc., that were or are being received or transmitted from the body worn network, processor, recording device or other sensor.

The UDC jack adapter 1307 and/or interconnected radio pouch 1302 may include an internal power source (not shown). This power source may be rechargeable and may rapid exchange of batteries. Any battery used in this context is sized to fit within the device and in the case of the UDC jack adapter may be relatively small.

In another embodiment of the present design, power may be obtained from the battery of the radio itself, the body worn network of the officer, the interconnected processor, body worn camera, or via any other reasonably available means. Power from the radio 1301 is currently used to drive a remote speaker and microphone when an external radio handset 1304 is connected to the radio 1301. Power may also be generated by other body worn power sources on the officer. Power sources may be dedicated batteries worn by the officer, power from the processor or other available electronics or components, or from the body worn recording device or any other system. The present design may also import power to the radio 1301 via the UDC connector 1309 to allow for constant or selective recharging of the radio battery from various sources. FIG. 13 shows two depictions of the radio 1301 and radio pouch 1302, one with external radio handset 1304 and one without.

Figure 14:
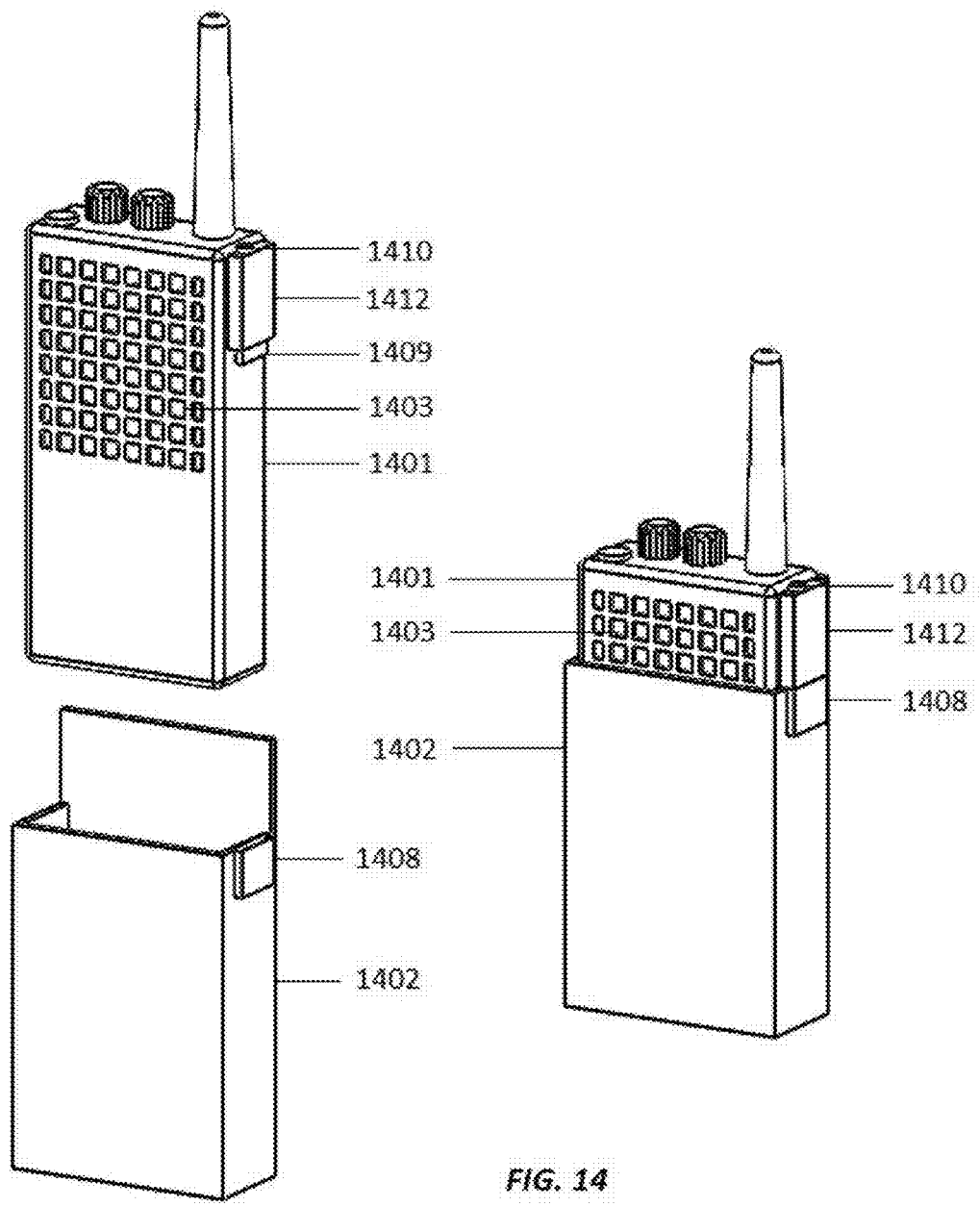
FIG. 14 shows the radio in and out of the pouch with the UDC jack adapter fitting within the receptacle offered with the pouch.

FIG. 14 shows various views including a radio 1401 within a radio pouch. From FIG. 14, a radio 1401 carried on the person of an officer is generally maintained inside a pouch, holster, cradle, bracket, clip, etc. or other device such that the radio 1401 can be attached in a "hands free" fashion and thereafter attached on the person of the officer (herein referred as a "radio pouch"). The radio pouch 1402 is generally attached to a belt worn by the officer such as the belt discussed herein but can be carried in various configurations and locations including but not limited to positions adjacent the officer's waist, vest, back, chest, thigh, helmet, etc. The radio pouch 1402 may be manufactured from various materials to including plastic, metal, leather, laminate, etc. and combinations thereof. The radio pouch 1402 is generally configured with a structured shape to facilitate ease of removal and insertion of radio 1401. The structured shape of the radio pouch 1402 can be helpful in protecting the radio 1401 from impact, damage, etc. The radio pouch 1402 generally is form fitted around/for the specific radio model to ensure the radio 1401 is held into place securely and in order to minimize inadvertent removal or loss of the radio 1401 when the officer is moving. Such radio pouches 1402 may also include some type of retention system to further secure the radio 1401 into the radio pouch. The retention system can be a strap, clasp, button, hook or any type of retention system.

FIG. 14 illustrates radio 1401, pouch 1402, speaker 1403, UDC interface adapter 1412, connector 1409, and emergency button 1410. On the left of FIG. 14 is the radio 1401 separated from pouch 1402, while on the right is radio 1401 in pouch 1402 with connector 1409 (not shown on the right side) in receptacle 1408.

One further embodiment of the present design provides for a network connection system built into or added to the side of the radio pouch. This network connection provides a network interface (electrical, data, etc.) to connect into the UDC connection 103 embedded in the body of the radio 1301 as described above. The connection point on the radio pouch may be hard mounted so as to provide a solid connection point so that upon insertion of the radio 1301 into the pouch, the radio UDC interface 1308 integrates and connects into the radio pouch network connection. The connection point on the radio pouch may be a non-rigid mounted device. The connection point may be a USB, FireWire, lighting link, etc. or any other method creating an interface between the radio 1301 and the radio pouch 1302. A transmitter (not shown) may be provided with the radio pouch to transmit data from the pouch to a remote location, including but not limited to data received via the UDC connection.

The connection point mounted on the radio pouch may have hard wiring running to the mounting point in the pouch where the pouch is connected to the person of the officer. This point has a connection between the radio pouch and an officer's belt or other portion of his or her equipment in order to integrate into the body worn network of the officer. This connection may be wired, wireless or connected by any other reasonable means. The connection point between the radio pouch 1302 on the officer's belt may be a semi rigid system encompassing a loop or other fastening system that upon a connection to the belt is firmly connected.

An alternate version of the present design provides a quick release system with the radio pouch 1302, where the quick release system is built into the back plate of the radio pouch 1302. The quick release system may be composed of metal, plastic, polymer or any other material. In this embodiment the belt mounted system quick release system is attached directly to the officer's belt. The belt mounted system has an adapter plate that accepts the adapter plate located on the back of the radio pouch 1302. The officer may then quickly remove the radio pouch 1302 from the adapter plate that remains retained on the officer's belt.

This design thereby provides the capability for the officer to remove the entire radio 1301 from the officer's body worn network while the radio 1301 still located inside the radio pouch 1302. The officer is then be able to reconnect the radio pouch 1302 into the radio belt assembly thereby reconnecting the entire radio system with an integrated UDC jack adapter 1307 connection into the body worn network. The same quick release mounting system is available for any derivative of mounting solutions for the radio pouch 1302 with integrated radio 1301 whether it was located on the officer's belt, the officer's chest, back, helmet, or otherwise.

The present design may encompass a radio pouch 1302 rigidly mounted to the officer's belt, or alternately a design allowing the pouch to move freely and swivel. In either case, the ability for the pouch to retain a network, electrical, and/or data connection to the officer's body worn network (such as an intelligent belt) remains.

In another embodiment of the present design, the connection into the radio accessory interface 103 may be positioned inside of the radio pouch. Such a connection interfaces with radio systems and adapters located on the body of the radio. Such an interface connects to the radio 1301 when the radio 1301 is placed inside of the radio pouch.

The present design enables a radio 1301 connected via a UDC jack adapter 1307 to connect into an adapter 1308 located inside or on the radio pouch 1302. Whenever the radio 1301 is placed inside of the pouch, the connection between the radio 1301 and the pouch is formed thereby completing a networked circuit for data, electrical, etc. In one embodiment, this network connection is integrated into an intelligent police belt system. This enables the radio 101 to be connected to the radio pouch 102 which is connected to the network belt. The network belt worn by the officer is connected to an attached processor, body worn camera, sensor, and/or any other device. The present design allows for transmission and receipt of video, electrical, meta-data signals between the radio 101 and the processor, body worn camera, or other device located on the officer. Additionally, this design allows for the radio 1301 to be integrated wirelessly into various sensors, processors, computers, and/or other devices that may be connected wirelessly or by wire to the officer's equipment.

Most radios have the capability of upgrading software built into the internal radio system. This upgrade of software is accomplished via various data ports located on or inside the body of the radio. One such data port is the UDC connection or accessory connection on the side of the radio body. Various capabilities of the system as described above interface with the radio via the connections and devices previously identified. Additional capabilities of other sensors in equipment carried by the officer may be connected to the radio itself or the officer's body worn network. Such a connection is made via the integration of the UDC jack adapter connection, wireless connection, UDC connection built into the body of the radio, or by any other method.

The software of the radio may be modified, updated, changed, etc. via the UDC connection connected via the radio pouch and receptacle into the body worn network. This software update capability allows for additional functions to be pushed into the software of the radio or additional capabilities to be pulled from the radio via the UDC connection or accessory connection. Such software augmentation may include capabilities such as creating remote emergency trigger activations by the radio upon receipt of automated triggers from sensors located on the body of the officer connected to officer's body worn network, body worn cameras, processors, other devices, etc.

Additionally, software augmentation allows additional capabilities to be pushed from the radio into the network system worn by the officer. For example the software augmentation may allow the radio transmissions and radio signals to be recorded by the processor or body worn camera located on the officer. These radio transmissions may be date and time stamped and integrated into audio/video recordings made by the officer's body worn camera. For example, the exact time when an officer pushed the radio transmission button may be recorded on the body worn camera, and the voiced transmission by the officer may also be recorded.

The present design also allows for updating of radio software. Such updating may be accomplished via the UDC connection into the network system of the officer, allowing the processor or other device worn by the officer to push software updates into the radio system. Such capability may decrease the time and effort needed for updating software and can allow for automated and immediate updates of critical software.

Thus according to the present design, there is provided a radio connection apparatus configured for use with a radio comprising an accessory connector arrangement. The radio connection apparatus comprises a radio connector configured to join with the radio accessory connector arrangement and a pouch connector configured to fixedly interconnect with a connector of a radio pouch such that removal of the radio from the pouch causes removal of the pouch connector from the connector of the radio pouch. The radio connector and pouch connector electrically interconnect with a processing device such that signals are transmitted between the radio and the processing device.

According to a further embodiment of the present design, there is provided a radio connector configured to connect a radio with a radio pouch and a processing device. The radio connector comprises radio connection hardware configured to connect the radio connector with the radio, and a pouch connector configured to fixedly interconnect with a connector of a radio pouch such that removal of the radio from the pouch causes removal of the pouch connector from the connector of the radio pouch. The radio connector and pouch connector electrically interconnect with the processing device such that signals are transmitted between the radio and the processing device through the radio connector and pouch connector.

According to another embodiment of the present design, there is provided a radio connection apparatus configured for use with a radio. The radio connection apparatus comprises a radio connector and a pouch connector provided with the radio connector and configured to fixedly interconnect with a connector of a radio pouch such that removal of the radio from the pouch causes removal of the pouch connector from the connector of the radio pouch. The radio connector and pouch connector electrically interconnect with a processing device via a belt wearable by a user such that signals are transmitted from the radio through electrical connections in the belt and to the processing device.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A radio connection apparatus configured for use with a radio comprising an accessory connector arrangement, the radio connection apparatus comprising:
    a radio connector comprising physical radio interconnection hardware configured to fit with and physically fixedly join with the radio accessory connector arrangement; and
    a pouch connector comprising a pouch connector plug configured to fit with and physically fixedly interconnect with a connector formed within a radio pouch, the radio pouch formed to receive an exterior of the radio such that physical removal of the radio from the radio pouch causes a corresponding physical removal of the pouch connector from the connector formed within the radio pouch;
    wherein the radio connector and pouch connector electrically interconnect with a processing device such that signals are transmitted between the radio and the processing device.

2. The radio connection apparatus of claim 1, wherein the accessory connector arrangement comprises a plurality of holes configured to receive a plurality of prongs provided on the radio connector.

3. The radio connection apparatus of claim 1, wherein the radio connector comprises a connection element providing connectability to a microphone/speaker assembly.

4. The radio connection apparatus of claim 1, wherein the radio connector comprises a button engageable by a user.

5. The radio connection apparatus of claim 2, further comprising a UDC (Universal Device Connector) element connectable to the radio connector.

6. The radio connection apparatus of claim 5, wherein the UDC element comprises a connection element providing connectability to a microphone/speaker assembly.

7. The radio connection apparatus of claim 5, wherein the radio connector comprises a plurality of holes configured to receive a plurality of prongs provided on the UDC element.

8. The radio connection apparatus of claim 1, wherein the radio connector is configured to wirelessly communicate with the pouch connector.

9. The radio connection apparatus of claim 1, wherein the radio connector and pouch connector electrically interconnect with the processing device via electrical connections provided in a belt wearable by a user.

10. A radio connector configured to connect a radio with a radio pouch and a processing device, comprising:
    radio connection hardware comprising physical radio interconnection hardware configured to fit with and physically fixedly connect the radio connector with the radio; and
    a pouch connector comprising a pouch connector plug configured to fit with and physically fixedly interconnect with a connector formed within a radio pouch, the radio pouch formed to receive an exterior of the radio such that physical removal of the radio from the radio pouch causes a corresponding physical removal of the pouch connector from the connector formed within the radio pouch;

wherein the radio connector and pouch connector electrically interconnect with the processing device such that signals are transmitted between the radio and the processing device through the radio connector and pouch connector.

11. The radio connector of claim 10, wherein the radio connection hardware comprises a plurality of prongs, and wherein a plurality of holes on the radio are configured to receive the plurality of prongs.

12. The radio connector of claim 10, wherein the radio connection hardware comprises a connection element providing connectability to a microphone/speaker assembly.

13. The radio connector of claim 10, wherein the radio connection hardware comprises a button engageable by a user.

14. The radio connector of claim 11, wherein the radio connector further comprises UDC connection hardware configured to connect to a UDC (Universal Device Connector) element.

15. The radio connector of claim 14, wherein the UDC element comprises a connection element providing connectability to a microphone/speaker assembly.

16. The radio connector of claim 14, wherein the UDC connection hardware comprises a plurality of holes formed within the radio connector configured to receive a plurality of prongs provided on the UDC element.

17. The radio connector of claim 10, wherein the radio connector is configured to wirelessly communicate with the pouch connector.

18. The radio connector of claim 10, wherein the radio connector electrically interconnects with the processing device via electrical connections provided in a belt wearable by a user.

19. A radio connection apparatus configured for use with a radio, comprising:
 a radio connector comprising physical radio interconnection hardware configured to fit with and physically fixedly connect with the radio; and
 a pouch connector comprising a pouch connector plug provided with and physically connected to the radio connector and configured to fit with and physically fixedly interconnect with a connector formed within a radio pouch, the radio pouch formed to receive an exterior of the radio such that physical removal of the radio from the radio pouch causes a corresponding physical removal of the pouch connector from the connector formed within the radio pouch;
 wherein the radio connector and pouch connector electrically interconnect with a processing device via a belt wearable by a user such that signals are transmitted from the radio through electrical connections in the belt and to the processing device.

20. The radio connection apparatus of claim 19, further comprising a UDC (Universal Device Connector) element connectable to the radio connector.

* * * * *